US008147894B2

(12) United States Patent
Euber et al.

(10) Patent No.: US 8,147,894 B2
(45) Date of Patent: Apr. 3, 2012

(54) ACIDIFIED LIQUID HUMAN MILK SUPPLEMENT

(75) Inventors: John R. Euber, Evansville, IN (US); Hector A. Solorio, Newburgh, IN (US); Rosanne P. Batema, Evansville, IN (US); Kelly R. Walsh, Newburgh, IN (US)

(73) Assignee: Mead Johnson Nutrition Company, Evansville, IN (US)

( * ) Notice: Subject to any disclaimer, the term of this patent is extended or adjusted under 35 U.S.C. 154(b) by 1017 days.

(21) Appl. No.: 12/106,415

(22) Filed: Apr. 21, 2008

(65) Prior Publication Data

US 2008/0286416 A1 Nov. 20, 2008

Related U.S. Application Data

(60) Provisional application No. 60/938,728, filed on May 18, 2007, provisional application No. 60/987,788, filed on Nov. 14, 2007.

(51) Int. Cl.
*A23C 9/20* (2006.01)
(52) U.S. Cl. ............. 426/601; 426/72; 426/73; 426/74; 426/585; 426/656; 426/658
(58) Field of Classification Search ............... 426/72, 426/73, 74, 656, 658, 585, 801, 601
See application file for complete search history.

(56) References Cited

U.S. PATENT DOCUMENTS

| | | | |
|---|---|---|---|
| 5,374,657 A | 12/1994 | Kyle | |
| 5,397,591 A | 3/1995 | Kyle et al. | |
| 5,550,156 A | 8/1996 | Kyle | |
| 5,985,339 A | 11/1999 | Kamarei | |
| 6,294,206 B1 * | 9/2001 | Barrett-Reis et al. | 426/72 |
| 6,436,464 B1 | 8/2002 | Euber | |
| 6,472,003 B2 | 10/2002 | Barrett-Reis et al. | |
| 6,475,539 B1 * | 11/2002 | DeWille et al. | 426/72 |
| 6,495,599 B2 | 12/2002 | Auestad et al. | |
| 6,596,302 B2 | 7/2003 | O'Connor et al. | |
| 6,627,213 B2 | 9/2003 | Gourley et al. | |
| 2002/0004527 A1 | 1/2002 | Auestad et al. | |
| 2002/0031576 A1 | 3/2002 | Barrett-Reis et al. | |
| 2002/0045660 A1 | 4/2002 | O'Connor et al. | |
| 2003/0175358 A1 | 9/2003 | Euber et al. | |
| 2003/0190363 A1 | 10/2003 | O'Connor et al. | |
| 2004/0142017 A1 | 7/2004 | Luebbers | |
| 2006/0204632 A1 * | 9/2006 | Barrett-Reis et al. | 426/580 |

FOREIGN PATENT DOCUMENTS

EP 0626176 11/1999
WO WO 2006/099013 9/2006

OTHER PUBLICATIONS

Janjindamai, W., et al., *Effect of Fortification on the Osmolality of Human Milk*, J. Med. Assoc. Thai. 89(9): 1400-1402 (2006).
American Academy of Pediatrics Committee on Nutrition, *Nutritional Needs of Preterm Infants*, Kleinman RE, ed. Pediatric Nutrition Handbook, 4th ed, Elk Grove Village, IL; 1998:55-87.
Nutrition Committee, Canadian Paediatric Society (CPS), *Canadian Medical Association Journal* 144:1451-1454 (1991).
Sejersen, M.T., et al., *Zeta Potential of Pectin-stabilised Casein Aggregates in Acidified Milk Drinks*, Int'l Daily Journal, 17 (2007) 302-307.
Lucey, J.A., et al., *Stability of Model Acid Milk Beverage: Effect of Pectin Concentration, Storage Temperature and Milk Heat Treatment*, J. of Texture Studies 30 (1999) 305-318.
Reis, B.B., et al., *Enhanced Growth of Preterm Infants Fed a New Powdered Human Milk Fortifier: A Randomized, Controlled Trial*, Pediatrics vol. 106 No. 3 (Sep. 3, 2000) p. 581-588.
Wauben, IPM, et al., *Growth and body composition of preterm infants: influence of nutrient fortification of mother's milk in hospital and breastfeeding post-hospital discharge*, Acta Paediatr 87:780-5 (1998).
Trachtenbarg, D.E., et al., *Care of the Premature Infant: Part I. Monitoring Growth and Development*, Amer. Family Physician (1998) [Online] http://www.aafp.org/afp/980501/ap/trachten.html.
Wauben, I.P., et al., *Moderate nutrient supplementation of mother's milk for preterm infants supports adequate bone mass and short-term growth: a randomized, controlled trial$^{1-3}$*, Am J Clin Nutr 1998; 67:465-72.
Schanler, R. J., *Symposium: Bioactivity in Milk and Bacterial Interactions in the Developing Immature Intestine*, Amer. Society for Nutr. Sciences J. Nutr. (2000) 130:417S-419S.
Sanchez-Hidalgo, V.M., et al., *A Fortifier Comprising Protein, Vitamins, and Calcium-Glycerophosphate for Preterm Human Milk*, Arch. of Med. Res. (2001) 31:564-70.
Dos Santos, M.M., et al., *Human Milk Concentrate for Preterm Infants*, Nutr. Res. (1996) vol. 16, No. 5, p. 769-772.
Raschko, P.K., et al., *Nutritional balance studies of VLBW infants fed their mothers' milk fortified with a liquid human milk fortifier*, J Pediatr Gastroenterol Nutr (Aug. 1989) 9(2): 212-8.
Itabashi, K., et al., *Fortified preterm human milk for very low birth weight infants*, Early Human Development, 29 (1992) 339-343.

* cited by examiner

*Primary Examiner* — Helen F Heggestad
(74) *Attorney, Agent, or Firm* — Waddey & Patterson, P.C.; James R. Cartiglia; Rebecca M. Barnett

(57) ABSTRACT

The present invention relates to a liquid human milk supplement comprising a protein component, a fat component, a carbohydrate component, vitamins, and minerals, where the pH of the human milk supplement is between about 4.0 and 4.6.

15 Claims, No Drawings

ACIDIFIED LIQUID HUMAN MILK SUPPLEMENT

BACKGROUND (1) Field of the Invention

The present invention relates to liquid human milk supplements for infants.

(2) Description of the Related Art

Preterm or premature infants are categorized as those infants born prior to the 37th week of gestation and/or weighing less than 2,500 grams at birth. Growth rates for preterm infants should ideally meet or exceed age-specific intrauterine growth rates in order to facilitate catch-up growth with term infants. Due to their undeveloped digestive systems and overall developmental immaturity, however, many preterm infants present special nutritional needs.

In general, human milk, because of its nutrient composition and immunological properties, is considered an ideal food for infants. While there are tremendous benefits provided by feeding preterm infants breast milk, their immature digestive systems and limited sucking and swallowing reflexes often prevent preterm infants from consuming adequate amounts of breast milk to satisfy their nutritional needs.

In addition, human milk is typically too low in protein and certain minerals to meet the demands for rapid growth required by many preterm infants. Thus, protein, which is crucial for growth and maintenance of lean body mass, as well as other mediators of biochemical function (e.g. enzymes, immune factors, and some hormones), should be supplemented into the diet of preterm human milk-fed infants. Minerals such as calcium and phosphorus, which are necessary for appropriate bone development and bone density, and vitamins such as, for example, vitamin D should also be supplemented into the diet of a preterm human milk-fed infant.

Furthermore, the energy density of human milk typically requires that preterm infants be fed a volume of milk that is too high to be well-tolerated by the infants. Typically, preterm infants can tolerate total daily feedings of between 100 and 150 ml per kg of the infant's weight. Since the caloric content of human milk is approximately 67 kcal per 100 ml of milk (20 kcal per fluid ounce of milk), and preterm infants require approximately 120 kcal per kg of weight per day, the volume of human milk that can be tolerated by these infants supplies less than 80% of the infants energy needs. Thus, in order to provide a caloric intake that meets the specialized nutritional needs of preterm infants in a volume of milk that the infants can tolerate, the caloric content of the human milk should be additionally supplemented with a source of energy such as fats or carbohydrates.

In addition to these considerations, it is important to provide a human milk supplement or fortifier in which the presence of microorganisms of public health significance and those of non-health significance, yet capable of reproducing in the product under storage and distribution conditions, are reduced or rendered harmless. Thus, it is clear that a need exists for a human milk supplement which can provide the additional calories, protein, vitamins and minerals needed for appropriate preterm nutrition and maintain microbiological quality throughout the shelf-life of the product.

SUMMARY OF THE INVENTION

Briefly, therefore, the present invention is directed to a novel liquid human milk supplement comprising a protein component, a fat component, a carbohydrate component, vitamins, and minerals. The pH of the human milk supplement may be between about 4.0 and 4.6.

The invention is also directed to a composition for administering to infants comprising a combination of the human milk supplement described above and human milk. The composition may have a ratio of supplement to milk of between about 1:2 and 1:10, 1:4 and 1:6 or about 1:5.

Additionally, the invention is directed to a liquid human milk supplement comprising a fat component and a carbohydrate component, wherein the pH of the human milk supplement is between about 4.0 and 4.6. In this embodiment of the invention, the fat component comprises greater than about 30% of the caloric content of the supplement and the carbohydrate component comprises less than about 10% of the caloric content of the supplement.

DETAILED DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance features illustrated or described as part of one embodiment can be used on another embodiment to yield a still further embodiment.

Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

As used herein, the terms "human milk supplement" or "human milk fortifier" refer to an additive for human milk. In some embodiments, the human milk supplement or fortifier may improve the nutritional content of certain components of human milk.

The term "liquid", as used herein, can encompass any water-based composition such as, for example, a fluid or a gel.

The term "probiotic" means a microorganism that can exert beneficial effects on the health of its host.

The term "prebiotic" means any ingredient that stimulates the growth and activity of the beneficial microbiota of the gastrointestinal tract.

The present invention is directed to an acidified liquid human milk supplement. More specifically, the human milk supplement contains protein, fat, carbohydrate, vitamins and minerals, and has a pH which is between about 4.0 and 4.6 in an embodiment. In other embodiments, the pH of the human milk supplement is less than about 4.6. In some embodiments, the pH of the supplement may be between about 4.2 and 4.4. In a particular embodiment, the pH of the formula may be about 4.3.

Most microorganisms exhibit optimal growth in a pH environment above 4.6. By providing an acidified human milk supplement having a pH of less than about 4.6, the growth of many human health pathogens, such as C. botulinum and E. sakazakii, as well as many food spoilage microorganisms may be reduced or prevented. A reduced pH may also prevent the growth of mesophilic and thermophilic spores. Thus, the present invention reduces the likelihood that microbial growth will occur in the product during the time the product is in shipment, in storage, or placed on a product display shelf.

Microbial populations that would grow at or below a pH of 4.6 are typically destroyed during the heat treatment of the product. By providing an acidified liquid human milk supplement, however, microbial thermal resistance is decreased and a less severe heat treatment is required to render the product microbiologically safe and shelf-stable. Heat sterilization of infant formulas and human milk supplements often causes browning of the product and degradation of the vitamins and heat-sensitive ingredients. This affects the color, taste, smell, and nutritional quality of the product. Thus, by providing an acidified human milk supplement which requires a less severe heat sterilization, browning and degradation of product quality can be reduced or avoided.

Although the pH of the supplemented human milk fed to an infant will be lowered when the human milk supplement of the invention is added to human milk, delivery of a nutrient rich diet is not impaired by the addition of the acidified human milk supplement. In addition, the human milk to which the supplement has been added maintains a low viscosity, contains few or no observable lumps or clumps, delivers the augmented nutrients, and the infant can be fed utilizing standard pre-term feeding equipment and methods.

In an embodiment, the supplement is added to human milk at a ratio of supplement:milk of between about 1:2 and 1:10. In another embodiment, the ratio of supplement-milk is between about 1:4 and 1:6. In a particular embodiment the ratio of supplement milk is about 1:5.

Thus, in an embodiment, about 5 ml of supplement may be added to between about 10 and 50 ml human milk. In another embodiment, about 5 ml of supplement may be added to between about 20 and 30 ml human milk. In a particular embodiment, about 5 ml of supplement may be added to about 25 ml human milk.

In a separate embodiment, the supplement of the invention may be administered separately from, but in combination with, a human milk diet. Thus, in this embodiment, about 5 ml of supplement may be fed to the infant separately from a human milk feeding. The ratio of supplement to milk in this embodiment may be between about 1:2 and 1:10, 1:4 and 1:6, or may be about 1:5.

In an embodiment of the human milk supplement, the fat component comprises greater than about 30% of the caloric content of the supplement and the carbohydrate component comprises less than about 10% of the caloric content of the supplement. It is believed that these levels of fat and carbohydrate will provide the increased caloric content required for preterm infants but minimize unnecessary increases in the osmolality of the human milk.

Osmoiality refers to the concentration of osmotically-active particles in an aqueous solution per unit weight of solvent, and is expressed in mOsm/kg solvent. When two solutions employing the same solvent but having different osmolality are contacted through a membrane permeable only to the solvent, the solvent will flow from the low osmolality solution to the high osmolality solution. This phenomenon is particularly pronounced when the dissolved compounds are certain species, such as simple carbohydrates and electrolytes, which are known to have high osmotic activity. Other species such as emulsified fats, the form of fat added to nutrient supplements, on the other hand, have low or no osmotic activity. When a hyperosmolar solution, i.e., an aqueous solution having osmolality higher than that of normal body fluids (approximately 300 mOsm/kg water), is ingested, certain undesirable gastrointestinal side effects may take place. The hyperosmolar solution may cause an osmotic effect in the stomach and small intestine in which water is drawn across the epithelium of the gastrointestinal tract into the lumen. This influx of water into the gastrointestinal tract dilutes the concentration of osmotically-active particles and may cause diarrhea, nausea, cramping, abdominal distension, regurgitation and vomiting.

Carbohydrates are an energy source readily available for incorporation into human milk supplements. However, they may have high osmotic activity, particularly simple carbohydrates or those carbohydrates that are rapidly hydrolyzed. Even complex carbohydrates, such as starch or maltodextrin, can significantly increase the osmolality of the supplemented human milk since they may be rapidly hydrolyzed by amylase, an enzyme normally present in human milk.

In an embodiment of the present invention, it has been discovered that a human milk supplement which comprises at least about 30% of the caloric content of the supplement from fat and less than about 10% of the caloric content of the supplement from carbohydrate results in a supplemented human milk that has an osmolality closer to that of unsupplemented human milk and which is well-tolerated by most premature infants. In an embodiment, osmolality increases resulting from the addition of the human milk supplement of the invention to human milk may be less than about 80 mOsm/kg water. In another embodiment, osmolality increases resulting from the addition of the human milk supplement of the invention to human milk may be less than about 50 mOsm/kg water. In still another embodiment, osmolality increases resulting from the addition of the human milk supplement of the invention to human milk may be between about 30 and 80 mOsm/kg water.

The fat component of the invention may comprise, in an embodiment, at least about 30% of the caloric content. In another embodiment, the fat component may comprise at least about 50% of the caloric content. In yet another embodiment, the fat component may comprise between about 50% and about 75% of the caloric content. In a particular embodiment, the fat component may comprise about 65% of the caloric content.

In other embodiments, the fat component, on a dry weight basis, could comprise up to about 55% of the human milk supplement, by weight, including from about 10% to about 55%, from about 15% to about 50%, and from about 35% to about 45%.

The carbohydrate component of the invention may comprise less than about 10% of the caloric content. In another embodiment, the carbohydrate component may comprise less than about 7% of the caloric content. In yet another embodiment, the carbohydrate component may comprise between about 2% and about 7% of the caloric content. In a further embodiment, the carbohydrate component may comprise between about 4% and about 7% of the caloric content. In a particular embodiment, the carbohydrate component may comprise between about 4.5% and about 6.5% of the caloric content. In yet another embodiment, the carbohydrate component may comprise between about 5.0 and 5.5% of the caloric content.

In other embodiments, the carbohydrate component, on a dry weight basis, could comprise up to about 65% of the human milk supplement, by weight, including from about 5% to about 30% and from about 5% to about 15%.

In addition to the above, it is particularly important for a preterm infant to receive adequate amounts of calcium. The human fetus accrues about 80% of the calcium present at term during the last trimester of pregnancy, and, therefore, in order to achieve similar rates of accretion to promote normal growth and bone mineralization, preterm infants require higher intakes per kilogram body weight of calcium than term infants. Inadequate supplies of calcium in the diet of the preterm infant may lead to osteopenia and increased risk of bone fracture. See American Academy of Pediatrics Committee on Nutrition. "Nutritional Needs of Preterm Infants". In, Kleinman R E, ed. Pediatric Nutrition Handbook. 4th ed. Elk Grove Village, Ill.; 1998:55-87.

In an embodiment, the amount of calcium present in the human milk supplement may be between about 20 and 40 mg per 5 ml supplement. In another embodiment, the amount of calcium present in the supplement may be between about 25 and 35 mg per 5 ml supplement. In a particular embodiment of the invention, the amount of calcium present in the supplement may be about 29 mg per 5 ml supplement. The calcium may be present in the supplement as soluble calcium, insoluble calcium, or a combination thereof.

Newborn term infants have approximately 75 mg/kg of body iron, 75% of which is in the form of hemoglobin. On average, infants almost triple their blood volume during the first year of life and will require the absorption of 0.4 to 0.6 mg daily of iron during that time to maintain adequate stores. Preterm infants, however, have lower iron levels at birth. The loss of blood drawn for laboratory tests and the rapid rate of postnatal growth lead to a higher requirement for dietary iron than in term infants—2.0 to 2.5 mg/kg daily to prevent late anemia. See Nutrition Committee, Canadian Paediatric Society (CPS), *Canadian Medical Association Journal* 144:1451-1454 (1991). Some of the consequences of iron deficiency include poor weight gain, impaired immune responses, gastrointestinal disturbances, irritability, decreased attention span, and impaired cognitive ability.

The supplement of the present invention may contain adequate amounts of iron to prevent the onset of anemia in preterm infants and avoid developmental abnormalities associated with iron deficiency. In certain embodiments, iron is present in an amount of about 0.1 mg to about 1.0 mg per 7.5 kcal of supplement. In other embodiments, iron is present in an amount of about 0.2 mg to about 0.75 mg per 7.5 kcal of supplement. In a particular embodiment, iron is present in an amount of about 0.44 mg per 7.5 kcal of supplement.

The present human milk supplement is designed such that, when added to human milk, the supplemented human milk is capable of delivering to the infant approximately 24 kcal per fluid ounce (approximately 81 kcal per 100 ml). In some embodiments, the human milk supplement of the invention comprises protein and minerals in amounts that are higher than those normally present in human milk. The higher concentration of nutrients in this embodiment of the invention also avoids over-dilution of the human milk to which the supplement is added.

In some embodiments, the liquid nutritional supplement of the present invention may contain at least 7.5 kcal per 5 ml supplement. In certain embodiments, the supplement contains between about 6 kcal and about 9 kcal per 5 ml supplement. In one embodiment, the supplement contains about 7.5 kcal per 5 ml supplement. In other embodiments, the supplement contains between about 6.25 and about 30 kcal per 5 ml supplement, depending upon its dilution ratio.

Any fat known in the art can be used in the present invention, provided it is suitable for combination with the other components of the supplement. Exemplary fats include soy oil, medium chain triglycerides (MCT oil), corn oil, olive oil, structured triglycerides, palm olein, sunflower oil, safflower oil, coconut oil, palm oil, cottonseed oil, high oleic safflower, high oleic sunflower, cottonseed oils, and canola oil. The fat source can comprise one or more of these oils. Emulsifiers, such as lecithin, may replace a small portion of the fat composition, but usually not more than 3%.

Any carbohydrate suitable for infant consumption may be used in the present invention, provided it is suitable for combination with the other components of the supplement. Commercial sources for these carbohydrates are known to the ordinary practitioner of the art. One particular carbohydrate that could be utilized is corn syrup solids. Other carbohydrates that are useful in the invention include starches, such as corn, tapioca, rice, or potato, cornstarch, maltodextrin, glucose polymers, sucrose, corn syrup, glucose, rice syrup, fructose, high fructose corn syrup, or indigestible oligosaccharides. The carbohydrate may be hydrolyzed (partially or extensively) or intact and may be non-modified or chemically modified.

Protein sources suitable for use in the present invention include most any protein or nitrogen source suitable for infant consumption, provided it is suitable for combination with the other components of the supplement. Examples of protein sources useful in the invention may include free amino acids, milk protein, casein, whey, animal protein, cereal protein, vegetable protein, or combinations thereof. Intact or hydrolyzed proteins, such as hydrolyzed whey protein isolate, can be used in the invention. If the protein is hydrolyzed, it may be partially hydrolyzed or extensively hydrolyzed. Particular proteins that may be used are hydrolyzed whey protein isolates such as BioZate 3, from Davisco Foods; WPH 8350, from Hilmar Ingredients; or WPH NZMP 917 or WPH Alacen 893, from Fonterra Ingredients. The protein source, in some embodiments, may be a combination of intact protein and hydrolyzed protein.

In some embodiments, the protein component may comprise about 30% of the caloric content of the supplement. In other embodiments, the protein component may comprise between 20% and 40% of the caloric content of the supplement. In other embodiments, the protein component could comprise between about 15% and 45% of the human milk supplement, by weight, including from about 20% to about 35% and from about 28% to about 33%, on a dry weight basis.

Vitamins that may be employed in the present invention include, for example, vitamin A, vitamin D, vitamin E, vitamin $K_1$, thiamin, riboflavin, vitamin $B_6$, vitamin $B_{12}$, niacin, folio acid, pantothenic acid, biotin, and vitamin C. Mineral nutrients that may be added include, for example, calcium, phosphorus, magnesium, zinc, manganese, copper, sodium, potassium, chloride, iron, selenium, chromium, and molybdenum. Additional vitamins and minerals that can be added are within the knowledge of a person with ordinary skill in the art who can determine the appropriate amount of vitamins and mineral nutrients following the recommendations of the Committee on Nutrition of the American Academy of Pediatrics or other groups of experts.

In a particular embodiment, the fat source in the supplement may comprise one or more long chain polyunsaturated fatty acids (LCPUFA) such as docosahexaenoic acid (DHA), arachidonic acid (ARA), and eicosapentanoic acid (EPA). The fat source may alternatively or additionally comprise LCPUFA precursors such as linoleic acid, α-linolenic acid, and γ-linolenic acid.

In one embodiment of the present invention, the fat source comprises DHA. In another embodiment of the present invention the fat source comprises ARA. In yet another embodiment the fat source may comprise both DHA and ARA. In this embodiment, the weight ratio of ARA:DHA may be from about 1:3 to about 9:1. In one embodiment of the present invention, this ratio is from about 1:2 to about 4:1. In yet another embodiment, the ratio is from about 2:3 to about 2:1.

In one particular embodiment the ratio is about 2:1. In another particular embodiment of the invention, the ratio is about 1:1.5. In other embodiments, the ratio is about 1:1.3. In still other embodiments, the ratio is about 1:1.9. In a particular embodiment, the ratio is about 1.5:1. In a further embodiment, the ratio is about 1.67:1. In yet another embodiment, the ratio is about 1.47:1.

In certain embodiments of the invention, the level of DHA may be between about 0.0% and 1.00% of total fat, by weight. In other embodiments, the level of DHA may be about 0.32% of total fat, by weight. In some embodiments, the level of DHA may be about 0.33% of total fat, by weight. In another embodiment, the level of DHA may be about 0.64% of total fat, by weight. In another embodiment, the level of DHA may be about 0.67% of total fat, by weight. In yet another embodiment, the level of DHA may be about 0.96% of total fat, by weight. In a further embodiment, the level of DHA may be about 1.00% of total fat, by weight.

In still other embodiments, the level of DHA may be between about 0.25% and 0.75% by weight of total fat. In a particular embodiment, the level of DHA may be about 0.5% by weight of total fat. In yet another embodiment, the level of DHA may be about 0.53% by weight of total fat.

In embodiments of the invention, the level of ARA is between 0.0% and 1.00% of total fat, by weight. In another embodiment, the level of ARA may be about 0.67% of total fat, by weight. In another embodiment, the level of ARA may be about 0.5% of total fat, by weight. In yet another embodiment, the level of DHA may be between about 0.47% and 0.48% of total fat, by weight.

In still other embodiments, the level of ARA may be between about 0.5% and 0.90% by weight of total fat. In another embodiment, the level of ARA may be between about 0.75% and 0.90% by weight of total fat. In yet another embodiment, the level of ARA may be about 0.88% by weight of total fat.

DHA, when used in the present invention, may be present in an amount sufficient, when combined with human milk, to deliver to an infant from about 3 mg per kg of body weight per day to about 150 mg per kg of body weight per day. In one embodiment of the invention, the amount to be delivered, when combined with human milk, is from about 6 mg per kg of body weight per day to about 100 mg per kg of body weight per day in another embodiment, the amount to be delivered, when combined with human milk, is from about 10 mg per kg of body weight per day to about 60 mg per kg of body weight per day. In yet another embodiment, the amount to be delivered, when combined with human milk, is from about 15 mg per kg of body weight per day to about 30 mg per kg of body weight per day.

ARA, when used in the present invention, may be from about 5 mg per kg of body weight per day to about 150 mg per kg of body weight per day. In one embodiment of this invention, the amount to be delivered, when combined with human milk, varies from about 10 mg per kg of body weight per day to about 120 mg per kg of body weight per day. In another embodiment, the amount to be delivered, when combined with human milk, varies from about 15 mg per kg of body weight per day to about 90 mg per kg of body weight per day. In yet another embodiment, the amount to be delivered, when combined with human milk, varies from about 20 mg per kg of body weight per day to about 60 mg per kg of body weight per day.

The amount of DHA, when included in the human milk supplement of the present invention, typically varies from about 5 mg/100 kcal to about 80 mg/00 kcal. In one embodiment of the present invention it varies from about 10 mg/100 kcal to about 50 mg/100 kcal; and in another embodiment from about 25 mg/100 kcal to about 60 mg/100 kcal. In a particular embodiment of the present invention, the amount of DHA is about 40 mg/100 kcal.

The amount of ARA, when included in the human milk supplement of the present invention, typically varies from about 10 mg/100 kcal to about 100 mg/100 kcal. In one embodiment of the present invention, the amount of ARA varies from about 15 mg/100 kcal to about 80 mg/100 kcal. In another embodiment the amount of ARA varies from about 40 mg/100 kcal to about 70 mg/100 kcal in a particular embodiment of the present invention, the amount of ARA is about 67 mg/100 kcal.

The human milk supplement supplemented with oils containing DHA and ARA for use in the present invention can be made using standard techniques known in the art. For example, they can be added to the human milk supplement by replacing an equivalent amount of an oil such as MCT oil, normally present in the supplement. As another example, the oils containing DHA and ARA can be added to the human milk supplement by replacing an equivalent amount of the rest of the overall fat blend normally present in the supplement without DHA and ARA.

The source of the ARA and DHA can be any source known in the art such as marine oil, fish oil, single cell oil, egg yolk lipid, brain lipid, and the like. The DHA and ARA can be in any form, provided that the remainder of the LCPUFA source does not result in any substantial deleterious effect on the infant. Alternatively, the DHA and ARA can be used in refined form.

Sources of DHA and ARA may be single cell oils as taught in U.S. Pat. Nos. 5,374,657, 5,550,156, and 5,397,591, the disclosures of which are incorporated herein by reference in their entirety.

The LCPUFA source may or may not contain eicosapentaenoic acid (EPA). In some embodiments, the LCPUFA used in the invention contains little or no EPA. For example, in certain embodiments, the human milk supplements used herein contain less than about 20 mg/100 kcal EPA; in some embodiments, less than about 10 mg/100 kcal EPA; in other embodiments, less than about 5 mg/100 kcal EPA; and in still other embodiments, substantially no EPA.

In a particular embodiment, the human milk supplement may contain probiotics. Any probiotic known in the art may be added, provided it is suitable for combination with the other components of the supplement. For example, the probiotic species may be chosen from the genera *Lactobacillus* and *Bifidobacterium*. Alternatively, the specific probiotic can be *Lactobacillus rhamnosus* GG.

In certain embodiments, the nutritional supplement of the present invention additionally comprises at least one prebiotic. In this embodiment, any prebiotic known in the art may be added, provided it is suitable for combination with the other components of the supplement. In a particular embodiment, the prebiotic can be selected from the group consisting of fructo-oligosaccharide, gluco-oligosaccharide, galacto-oligosaccharide, inulin, polydextrose, isomalto-oligosaccharide, xylo-oligosaccharide and lactulose.

In some embodiments, the acidified liquid human milk supplement of the invention contains pectin. While not wishing to be bound to this or any theory, it is believed that the addition of pectin to the present invention may help to stabilize the protein source at the low pH. The addition of pectin provides an acidified liquid human milk supplement which is less viscous than the supplement would be otherwise. The addition of pectin to the acidified liquid human milk supplement may also assist in the packaging of the product by reducing foam formation, creaming or fat separation, and/or sedimentation of minerals and/or protein. In addition, the size of insoluble particles, such as protein, is smaller in the product containing pectin. This results in a product with a better appearance. The product appears less curdled and is also more apt to deliver the nutrients contained therein to the infant because the nutrients are better suspended in the product. The nutrients are less likely to settle and/or stick to tubing or bottles.

The acidified liquid human milk supplement of the invention is useful in the feeding of preterm infants or low birth weight infants. The supplement may also be useful in the feeding of "failure to thrive" infants. In some embodiments, the invention is directed to method of supporting and enhancing the growth of an infant via the administration of the human milk supplement of the present invention.

"Failure to thrive" (FTT), a descriptive term and not a definitive clinical diagnosis, is used to describe infants and children whose weight 1) is consistently below the 3rd percentile for their age, 2) progressively decreases to below the 3rd percentile, 3) is 80% of the ideal weight for their height and age, or 4) decreases at an unexpected rate based on the individual's previously defined growth curve, irrespective of whether below the 3rd percentile. FTT may result from a variety of underlying causes, including, but not limited to, decreased nutrient intake caused by cleft lip and/or palate, gastroesophageal reflux, or rumination; malabsorption due to disorders such as celiac disease, cystic fibrosis, or disaccharidase deficiency; impaired metabolism symptomatic of fructose intolerance or classic galactosemia; increased excretion resulting from conditions such as diabetes mellitus and proteinuria; and increased energy requirements of diseases such as bronchopulmonary dysplasia, cystic fibrosis, or hyperthyroidism. Approximately 3-5% of all children admitted to tertiary care centers, and 1% of all children admitted to any hospital, exhibit FTT. Like premature infants, FTT infants have additional nutritional requirements not met by mother's breast milk. Thus, the human milk supplement of the present invention may also be utilized in feeding or treating FTT infants.

The human milk supplement of this invention can be manufactured using techniques well-known to those skilled in the art. One embodiment of the preparation of the human milk supplement is set forth in Example 3. Manufacturing variations, however, are well-known to those skilled in the nutritional formula art and the invention is not limited to the preparation set forth in Example 3.

In an embodiment, the supplement is aseptically sterilized and packaged during the manufacturing process. The human milk supplement of the present invention can be sterilized prior to packaging using an ultra-high temperature (UHT) process that rapidly heats and then cools the product. The processing equipment allows the time (generally 3 to 15 seconds) and temperature (195° to 285° F.) to be tailored to place the least amount of thermal stress on the product while ensuring safety. Example 3 sets forth an embodiment of the invention using the UHT process. The product may then be filled into a sterile package and sealed in an environment which prevents recontamination of the product with microorganisms. Thus, in some embodiments, the liquid human milk fortifier is shelf stable.

Compared with traditional retort sterilization, where products are heated in a package for 5 to 50 minutes, UHT heating and cooling process provides a significant reduction in the energy use and nutrient loss associated with conventional sterilization. As a result, an aseptically packaged liquid nutritional supplement retains more nutritional value and exhibits more natural texture, color and taste, all while using less energy.

Numerous types of packaging containers are readily available and known to one of skill in the art. Examples of container types typically include packets or sachets which may be manufactured of paper, foil and plastic film, or foil and plastic film coated paper; and ampoules which may be manufactured of plastic, reinforced paper or glass.

In a particular embodiment, the human milk supplement is filled into a form or blow-fill-seal package and sealed in an environment which prevents recontamination of the product with microorganisms. In this embodiment, a container is formed, filled with the human milk supplement, and sealed in a continuous process without human intervention in an enclosed area designed and operated to minimize the probability of contamination with microorganisms. Such a package may be a unit dose of human milk supplement. Thus, the package may contain about 5 ml of supplement, which is designed to be directly added to human milk.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples, all percentages are given on a weight per volume basis unless otherwise indicated.

EXAMPLE 1

This example illustrates one embodiment of the acidified liquid human milk supplement of the present invention. Table 1 illustrates the amount of macronutrients (proteins, fats and carbohydrates), as well as vitamins and mineral nutrients present in 5 ml of the human milk supplement. The caloric content in 5 ml is approximately 7.5 kcal. To use, 5 ml of the human milk fortifier is added to about 25 ml of mother's milk and is then fed to an infant.

TABLE 1

Nutrient Information for Human Milk Supplement

| NUTRIENT, Unit | Per 7.5 Calories (5 ml) |
|---|---|
| Protein, g | 0.56 |
| Carbohydrate, g | 0.12 |
| Fat, g | 0.58 |
| Linoleic acid, mg | 58 |
| α-Linolenic acid, mg | 5.6 |
| Arachidonic acid, mg | 5 |
| Docosahexaenoic acid, mg | 3 |
| Vitamin A, IU | 290 |
| Vitamin D, IU | 47 |
| Vitamin E, IU | 1.4 |
| Vitamin K, µg | 1.42 |
| Thiamin (Vitamin $B_1$), µg | 46 |
| Riboflavin (Vitamin $B_2$), µg | 66 |
| Vitamin $B_6$, µg | 35 |
| Vitamin $B_{12}$, µg | 0.06 |
| Niacin, µg | 920 |
| Folic acid, µg | 7.7 |
| Pantothenic acid, µg | 230 |
| Biotin, µg | 0.84 |
| Vitamin C, mg | 3.8 |
| Calcium, mg | 29 |
| Phosphorus, mg | 15.8 |

TABLE 1-continued

Nutrient Information for Human Milk Supplement

| NUTRIENT, Unit | Per 7.5 Calories (5 ml) |
|---|---|
| Magnesium, mg | 0.46 |
| Iron, mg | 0.44 |
| Zinc, mg | 0.24 |
| Manganese, μg | 2.5 |
| Copper, μg | 15 |
| Sodium, mg | 6.1 |
| Potassium, mg | 11.3 |
| Chloride, mg | 6.9 |

Table 2 illustrates a list of the ingredients in the acidified liquid human milk supplement of Example 1 per 10,000 liters.

TABLE 2

Components of 10,000 Liters of Example 1 Nutrient Supplement

| | |
|---|---|
| Hydrolyzed Whey Protein Isolate (90.24% protein, 4.4% water, 0.45% fat, 0.35% carbohydrate) | 1241.331 kg |
| MCT Oil (Medium Chain Triglycerides) | 883.000 kg |
| Soybean Oil | 225.026 kg |
| Calcium Citrate | 154.518 kg |
| Calcium Phosphate, monobasic | 135.765 kg |
| Citric Acid | 105.012 kg |
| Potassium Citrate | 32.254 kg |
| Calcium Chloride, dihydrate | 28.278 kg |
| Single Cell Arachidonic Acid Oil | 26.928 kg |
| Ascorbic Acid | 24.809 kg |
| Niacinamide | 2723.111 g |
| Corn Syrup Solids | 1232.400 g |
| Calcium Pantothenate | 746.588 g |
| Biotin Trituration 1% | 248.205 g |
| Riboflavin | 199.402 g |
| Vitamin $B_{12}$, 0.1% in starch | 175.987 g |
| Thiamin Hydrochloride | 139.508 g |
| Pyridoxine Hydrochloride | 124.719 g |
| Folic Acid | 25.141 g |
| Single Cell Docosahexaenoic Acid Oil | 16.157 kg |
| Tocopheryl Acetate, dl-alpha | 4190.438 g |
| Soybean Oil | 3223.600 g |
| Vitamin A Palmitate | 499.900 g |
| Cholecalciferol concentrate | 140.710 g |
| Vitamin $K_1$ liquid phytonadione | 4.352 g |
| Magnesium Phosphate, dibasic | 5.551 kg |
| Ferrous Sulfate, heptahydrate | 4.802 kg |
| Sodium Citrate, dehydrate | 1.650 kg |
| Zinc Sulfate, monohydrate | 1.590 kg |
| Cupric Sulfate, pentahydrate | 0.143 kg |
| Water, deflouridated | q.s. to 10,508.700 kg |

The quantity of citric acid may be adjusted to control the pH of the composition. An antifoam emulsion may be used as a processing aid in the composition. As an example, a food grade antifoam emulsion, such as 1520-US, from Dow Corning, may be added at a rate of 0.466 kg per 10,000 liters to reduce foam during production.

As an alternative to Table 2, the human milk supplement may contain a dry vitamin premix which contains, per 100 kg, 77.219 kg ascorbic acid, 11.048 kg niacinamide, 5.000 kg corn syrup solids (restricted sodium), 3.029 kg calcium pantothenate, 1.007 kg biotin trituration 1%, 0.809 kg riboflavin, 0.714 kg vitamin $B_{12}$, 0.1% in starch, 0.566 kg thiamin hydrochloride, 0.506 kg pyridoxine hydrochloride, and 0.102 kg folic acid.

The amount of Thiamin per 1 gram premix may vary between about 4.97 and 6.28 mg. The amount of Riboflavin per 1 gram premix may vary between about 7.34 and 9.28 mg. The amount of Pyridoxine per 1 gram premix may vary between about 3.78 and 4.77 mg. The amount of Vitamin $B_{12}$ per 1 gram premix may vary between about 4.97 and 6.28 mcg. The amount of Niacin per 1 gram premix may vary between about 100 and 127 mg. The amount of Folic Acid per 1 gram premix may vary between about 845 and 1070 mcg. The amount of Pantothenic Acid per 1 gram premix may vary between about 24.8 and 31.4 mg. The amount of Biotin per 1 gram premix may vary between about 91.9 and 116 mcg. The amount of Vitamin C per 1 gram premix may vary between about 702 and 887 mg.

Similarly, as an alternative to Table 2, the human milk supplement may contain a liquid vitamin premix which may contain, per 100 kg, 51.997 kg tocopheryl acetate, di-alpha, 40.000 kg soybean oil, 6.203 kg vitamin A palmitate, 1.746 kg cholecalciferol concentrate, and 0.054 kg vitamin $K_1$, liquid phytonadione. The amount of vitamin A per 1 gram premix may vary between about 98,000 and 124,000 IU. The amount of vitamin $D_3$ per 1 gram premix may vary between about 15,900 and 20,100 IU. The amount of vitamin E per 1 gram premix may vary between about 473 and 598 IU. The amount of vitamin $K_1$ per 1 gram premix may vary between about 494 and 624 mcg.

Table 3 illustrates the proximate analysis information for the human milk supplement of Example 1.

TABLE 3

Proximate Analysis

| | Grams per 100 g | Grams per 100 ml | Caloric Distribution, % |
|---|---|---|---|
| Protein | 10.66 | 11.20 | 30 |
| Fat | 11.08 | 11.64 | 65 |
| CHO | 2.36 | 2.48 | 5 |
| Ash | 2.62 | 2.75 | |
| Water | 73.28 | 77.01 | |
| Total Solids | 26.72 | 28.08 | |

The density of the human milk supplement of Example 1 is about 1.05 g/ml. The pH ranges between about 4.25 and 4.40, pre- and post-sterilization (at 86° F.). The viscosity of the composition is about 200 cp pre-sterilization and 400 cp post-sterilization, as measured on a Brookfield #2 spindle at 30 rpm and 86° F. The osmolality of the product diluted in water (25 ml water and 5 ml product) is 68 mOsm/kg water.

EXAMPLE 2

This example illustrates another embodiment of the acidified liquid human milk supplement of the present invention. Table 4 illustrates the amount of macronutrients (proteins, fats and carbohydrates), as well as vitamins and mineral nutrients present in 5 ml of the human milk supplement. The caloric content in 5 ml is approximately 7.5 kcal. To use, 5 ml of the human milk fortifier is added to about 25 ml of mother's milk and is then fed to an infant.

TABLE 4

Nutrient Information for Human Milk Supplement

| NUTRIENT, Unit | Per 7.5 Calories (5 ml) |
|---|---|
| Protein, g | 0.56 |
| Carbohydrate, g | 0.15 |
| Fat, g | 0.58 |
| Linoleic acid, mg | 58 |
| α-Linolenic acid, mg | 5.6 |

TABLE 4-continued

Nutrient Information for Human Milk Supplement

| NUTRIENT, Unit | Per 7.5 Calories (5 ml) |
|---|---|
| Arachidonic acid, mg | 5 |
| Docosahexaenoic acid, mg | 3 |
| Vitamin A, IU | 290 |
| Vitamin D, IU | 47 |
| Vitamin E, IU | 1.4 |
| Vitamin K, µg | 1.42 |
| Thiamin (Vitamin $B_1$), µg | 46 |
| Riboflavin (Vitamin $B_2$), µg | 66 |
| Vitamin $B_6$, µg | 35 |
| Vitamin $B_{12}$, µg | 0.06 |
| Niacin, µg | 920 |
| Folic acid, µg | 7.7 |
| Pantothenic acid, µg | 230 |
| Biotin, µg | 0.84 |
| Vitamin C, mg | 3.8 |
| Calcium, mg | 29 |
| Phosphorus, mg | 15.8 |
| Magnesium, mg | 0.46 |
| Iron, mg | 0.44 |
| Zinc, mg | 0.24 |
| Manganese, µg | 2.5 |
| Copper, µg | 15 |
| Sodium, mg | 6.1 |
| Potassium, mg | 11.3 |
| Chloride, mg | 6.9 |

Table 5 illustrates a list of the ingredients in the acidified liquid human milk supplement of Example 2 per 10,000 liters.

TABLE 5

| Components of 10,000 Liters of Example 2 Nutrient Supplement | |
|---|---|
| Hydrolyzed Whey Protein Isolate (90.24% protein, 4.4% water, 0.45% fat, 0.35% carbohydrate) | 1241.331 kg |
| MCT Oil (Medium Chain Triglycerides) | 883.000 kg |
| Soybean Oil | 225.026 kg |
| Calcium Citrate | 154.518 kg |
| Calcium Phosphate, monobasic | 135.765 kg |
| Citric Acid | 105.012 kg |
| Pectin | 52.656 kg |
| Potassium Citrate | 32.254 kg |
| Calcium Chloride, dihydrate | 28.278 kg |
| Single Cell Arachidonic Acid Oil | 26.928 kg |
| Ascorbic Acid | 24.809 kg |
| Niacinamide | 2723.111 g |
| Corn Syrup Solids | 1232.400 g |
| Calcium Pantothenate | 746.588 g |
| Biotin Trituration 1% | 248.205 g |
| Riboflavin | 199.402 g |
| Vitamin $B_{12}$, 0.1% in starch | 175.987 g |
| Thiamin Hydrochloride | 139.508 g |
| Pyridoxine Hydrochloride | 124.719 g |
| Folic Acid | 25.141 g |
| Single Cell Docosahexaenoic Acid Oil | 16.157 kg |
| Tocopheryl Acetate, dl-alpha | 4190.438 g |
| Soybean Oil | 3223.600 g |
| Vitamin A Palmitate | 499.900 g |
| Cholecalciferol concentrate | 140.710 g |
| Vitamin $K_1$ liquid phytonadione | 4.352 g |
| Magnesium Phosphate, dibasic | 5.551 kg |
| Ferrous Sulfate, heptahydrate | 4.802 kg |
| Sodium Citrate, dehydrate | 1.650 kg |
| Zinc Sulfate, monohydrate | 1.590 kg |
| Cupric Sulfate, pentahydrate | 0.143 kg |
| Water, deflouridated | q.s. to 10,527.000 kg |

Table 6 illustrates the proximate analysis information for the human milk supplement of Example 2.

TABLE 6

| Proximate Analysis | | | |
|---|---|---|---|
| | Grams per 100 g | Grams per 100 ml | Caloric Distribution, % |
| Protein | 10.64 | 11.20 | 30 |
| Fat | 11.06 | 11.64 | 65 |
| CHO | 2.81 | 2.96 | 5 |
| Ash | 2.63 | 2.77 | |
| Water | 72.85 | 76.69 | |
| Total Solids | 27.14 | 28.57 | |

The density of the human milk supplement of Example 2 is about 1.05 g/ml. The pH ranges between about 4.25 and 4.40, pre- and post-sterilization (at 86° F.). The viscosity of the composition is about 800 cp pre-sterilization and 100 cp post-sterilization, as measured on a Brookfield #2 spindle at 30 rpm and 86° F. The osmolality of the product diluted in water (25 ml water and 5 ml product) is 68 mOsm/kg water.

EXAMPLE 3

This example illustrates one exemplary process for preparing an embodiment of an acidified liquid human milk supplement of the present invention. The protein preparation was prepared by weighing 1241.331 kg hydrolyzed whey protein isolate and dissolving it in 150° F. water that was subjected to reverse osmosis. After thirty minutes, the protein preparation was transferred to a mix tank. A polydimethylsiloxane-based antifoam component was added to the mixture in an amount of about 0.466 kg per 10,000 L.

A pectin preparation was prepared by weighing 52.656 kg pectin and dissolving it in 160° F. water (subjected to reverse osmosis) in a mineral preparation tank. After five minutes, the pectin preparation was transferred to the mix tank with the protein preparation.

A mineral preparation was prepared by measuring various mineral salts, such as those set forth in Examples 1 or 2, and dissolving them in 120° F. water (subjected to reverse osmosis) in a separate mineral preparation tank. The mineral preparation was then transferred to the mix tank. An acidulant, 105.012 kg citric acid, was additionally added to the mix tank.

An oils preparation was prepared by weighing vegetable oils, fungal/algal oils, and/or fat-soluble vitamins and blending them together in an oil preparation tank. More specifically, 883.000 kg MCT oil, 225.026 g soybean oil, 16.157 kg single cell docosahexaenoic acid oil, and 26.928 kg single cell arachidonic acid oil were intermixed. Various fat-soluble vitamins, such as those set forth in Examples 1 or 2, were then intermixed with the oils. The oils preparation was heated to 150° F. and added to the mix tank.

The mixture in the mix tank was brought to a temperature of 150° F. and had a total solids percentage of approximately 30%. The flow rate of the mixture through the homogenizer was approximately 1.5 gallons per minute. The mixture was then subjected to a 2-stage single-pass homogenization process. The first stage of the homogenization was conducted at 3500 pounds per square inch (psi) and the second stage at 500 psi. The mixture was cooled and transferred to a non-sterile surge tank.

Water-soluble vitamins were weighed, dissolved in water, and added to the surge tank. The total solids percentage was approximately 27.4%. The mixture was pre-heated to 180° F., followed by a final heating to 270° F. and held for approximately 3.3 seconds. The mixture was cooled to 100° F. and then underwent a final cooling to 80° F. The heat-processed product was filled into a pre-sterilized aseptic tank and, from there, was aseptically packaged in blow-fill-seal vials.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part. For example, while particular embodiments have been exemplified, other uses are contemplated. Therefore, the spirit and scope of the appended claims should not be limited to the description of the preferred versions contained therein.

What is claimed is:

1. A liquid human milk supplement comprising:
    a protein component;
    a fat component, wherein the fat component consists of greater than about 50% of the caloric content of the supplement and further wherein the fat component comprises up to about 55% of the supplement on a dry weight basis;
    a carbohydrate component, wherein the carbohydrate component consists of less than about 10% of the caloric content of the supplement;
    vitamins; and
    minerals, wherein the pH of the human milk supplement is between about 4.0 and 4.6.

2. The liquid human milk supplement of claim 1 wherein the pH of the supplement is between about 4.2 and 4.4.

3. The liquid human milk supplement of claim 1 wherein the pH of the supplement is less than about 4.6.

4. The liquid human milk supplement of claim 1 wherein the fat component comprises a fat source selected from the group consisting of docosahexaenoic acid, arachidonic acid and combinations thereof.

5. The liquid human milk supplement of claim 1 wherein the fat component comprises medium chain triglycerides.

6. The liquid human milk supplement of claim 1 wherein the carbohydrate component comprises less than about 7% of the caloric content of the supplement.

7. The liquid human milk supplement of claim 1 wherein the protein component comprises about 30% of the caloric content of the supplement.

8. The liquid human milk supplement of claim 1 wherein the protein component is selected from the group consisting of whey protein, casein protein, and combinations thereof.

9. The liquid human milk supplement of claim 1 additionally comprising pectin.

10. The liquid human milk supplement of claim 9 wherein the supplement contains between about 40 and 60 kg pectin per 10,000 L supplement.

11. The liquid human milk supplement of claim 9 wherein the supplement contains between about 50 and 56 kg pectin per 10,000 L supplement.

12. A composition for administration to infants comprising:
    (i) a liquid human milk supplement which comprises
        a protein component;
        a fat component, wherein the fat component consists of greater than about 50% of the caloric content of the supplement and further wherein the fat component consists of up to about 55% of the supplement on a dry weight basis;
        wherein the carbohydrate component consists of less than 10% of the caloric component;
        a carbohydrate component
        vitamins; and
        minerals, wherein the pH of the human milk supplement is between about 4.0 and 4.6; and
    (ii) human milk, wherein the ratio of supplement to milk is between about 1:2 and 1:10.

13. The composition according to claim 12, wherein the ratio of supplement to milk is between about 1:4 and 1:6.

14. The composition according to claim 12, wherein the ratio of supplement to milk is about 1:5.

15. A method for supporting the growth of an infant by administering a composition comprising:
    (i) a liquid human milk supplement which consists of
        a protein component;
        a fat component, wherein the fat component comprises greater than about 50% of the caloric content of the supplement and further wherein the fat component consists of up to about 55% of the supplement on a dry weight basis;
        wherein the carbohydrate component consists of less than 10% of the caloric component;
        a carbohydrate component
        vitamins; and
        minerals, wherein the pH of the human milk supplement is between about 4.0 and 4.6; and
    (ii) human milk, wherein the ratio of supplement to milk is between about 1:2 and 1:10.

* * * * *